(12) United States Patent
Wilner et al.

(10) Patent No.: US 7,213,247 B1
(45) Date of Patent: May 1, 2007

(54) PROTECTION DOMAINS FOR A COMPUTER OPERATING SYSTEM

(75) Inventors: David N. Wilner, Berkeley, CA (US); John C. Fogelin, Piedmont, CA (US); Kent D. Long, Orinda, CA (US); Thierry C. Preyssler, Oakland, CA (US); Maarten A. Koning, Bloomfield (CA); John Gordon, Alameda, CA (US); Cy H. Myers, Berkeley, CA (US)

(73) Assignee: Wind River Systems, Inc., Alameda, CA (US)

( * ) Notice: Subject to any disclaimer, the term of this patent is extended or adjusted under 35 U.S.C. 154(b) by 0 days.

(21) Appl. No.: 09/480,309

(22) Filed: Jan. 10, 2000

(51) Int. Cl.
*G06F 9/54* (2006.01)
*G06F 9/445* (2006.01)
*G06F 12/14* (2006.01)

(52) U.S. Cl. ............ 718/100; 719/332; 711/163; 717/162; 726/2

(58) Field of Classification Search ............ 709/1, 709/100, 102, 104, 106; 717/1–178; 711/1–221; 718/1, 100–108; 719/310–332; 726/1–26
See application file for complete search history.

(56) References Cited

U.S. PATENT DOCUMENTS

| | | | | |
|---|---|---|---|---|
| 4,430,705 A | * | 2/1984 | Cannavino et al. | 711/206 |
| 4,787,031 A | * | 11/1988 | Karger et al. | 718/100 |
| 5,359,721 A | * | 10/1994 | Kempf et al. | 709/331 |
| 5,481,713 A | * | 1/1996 | Wetmore et al. | 717/170 |
| 5,590,331 A | * | 12/1996 | Lewis et al. | 717/144 |
| 5,790,860 A | * | 8/1998 | Wetmore et al. | 717/122 |
| 5,845,129 A | * | 12/1998 | Wendorf et al. | 710/200 |
| 5,915,131 A | * | 6/1999 | Knight et al. | 710/72 |
| 6,125,447 A | * | 9/2000 | Gong | 713/201 |
| 6,199,152 B1 | * | 3/2001 | Kelly et al. | 711/207 |
| 6,256,657 B1 | * | 7/2001 | Chu | 718/1 |
| 6,317,868 B1 | * | 11/2001 | Grimm et al. | 717/127 |
| 6,360,244 B1 | * | 3/2002 | Bharadhwaj | 709/108 |
| 6,463,549 B1 | * | 10/2002 | Shperber et al. | 714/7 |
| 6,542,919 B1 | * | 4/2003 | Wendorf et al. | 709/100 |
| 6,546,546 B1 | * | 4/2003 | Van Doorn | 717/114 |
| 6,604,123 B1 | * | 8/2003 | Bruno et al. | 718/100 |

FOREIGN PATENT DOCUMENTS

| | | |
|---|---|---|
| EP | 0547759 | 6/1993 |
| EP | 0718760 | 6/1996 |
| WO | WO 94/27219 | 11/1994 |
| WO | WO 97/36236 | 10/1997 |
| WO | WO 99/30217 | 6/1999 |

OTHER PUBLICATIONS

Carter, John B. et al. "Distributed Operating Systems Based on a Protected Global Virtual Address Space." Rice University, Department of Computer Science. 1992.*

(Continued)

*Primary Examiner*—Lewis A. Bullock, Jr.
(74) *Attorney, Agent, or Firm*—Fay Kaplun & Marcin, LLP

(57) ABSTRACT

A protection domain system is implemented to provide protection for applications executing in a computing environment. Protection domains are allocated system resources and may contain executing tasks. The protection domain system may allow tasks to access resources in other protection domains to which attachments have been made. Attachment is transparent to the software developer. The protection domain system provides flexibility in implementing operating system services and defining protection hierarchies.

9 Claims, 16 Drawing Sheets

OTHER PUBLICATIONS

Yarvin, Curtis et al. "Low-Latency Protection in a 64-Bit Address Space." USENIX. Jun. 21-25, 1993.*

"The Design and Implementation of the Clouds Distributed Operating System," Dasgupta (Georgia Tech), Computing Systems, Winter 1990.

"A Micro Kernal Architecture for Next Generation Processors," Okamoto (Toshiba Corp.), USENIX, 1992.

"Sharing and Protection in a Single Address Space Operating System (Opal)," Chase (University of Washington), 1995.

Jeff Bonwick, The Slab Allocator: An Object-Caching Kernel Memory Allocator, 1994, 12 pages, Sun Microsystems.

Draves et al., The Rialto Virtual Memory System, Feb. 15, 1997, 14 pages, Microsoft Research.

Jones et al., An Overview of the Rialto Real-Time Architecture, Jul. 1996, 9 pages, Microsoft Research.

Mitchell et al., An Overview of the Spring System, 1994, 10 pages, Sun Microsystems Inc.

Khalidi et al., The Spring Virutal Memory System, Feb. 1993, 25 pages, Sun Microsystems Laboratories, Inc.

Hamilton et al., Subcontract: A Flexible Base for Distributed Programming, 1993, 11 pages, Sun Microsystems Laboratories, Inc.

Radia et al., Persistence in the Spring System, Dec. 1993, 12 pages, Sun Microsystems, Inc.

Radia et al., The Spring Name Service, Nov. 1993, 27 pages, Sun Microsystems Laboratories, Inc.

Radia et al., Naming Policies in the Spring System, 11 pages, Sun Microsystems Laboratories, Inc.

Hamilton et al., The Spring Nucleus A MicroKernel for Objects, Jul. 1993, 14 pages, Sun Microsystems Laboratories, Inc.

Nelson et al., High Performance Dynamic Linking Through Caching, 1993, 14 pages, Sun Microsystems Laboratories, Inc.

Reed et al., Nemesis The Kernel, Overview, May 20, 1997, 56 pages.

Steven Hand, ESPRIT LTR 21917 (Pegasus II), Deliverable 2.3.1: Virtual Address Management: Deliverable 2.3.2: Virtual Memory Management, Jul. 1997, 16 pages, University of Cambridge.

Timothy Roscoe, Linkage in the Nemesis Single Address Space Operating System, May 1994, 8 pages, Computer Laboratory, University of Cambridge.

Richard Black, ESPRIT LTR 21917 (Pegasus II), Deliverable 2.1.4., ARM Port Report, Jun. 1997, 13 pages, University of Cambridge, University of Glasgow.

Kempf et al., Cross-address Space Dynamic Linking, Sep. 1992, 12 pages, Sun Microsystems Laboratories, Inc.

Heiser et al., Implementation and Performance of the Mungi Single-Address-Space Operating System, Jun. 1997, 23 pages, IBM T. J. Watson, Research Center.

Vochteloo et al., Protection Domain Extensions in Mungi, Oct. 1996, 5 pages, School of Computer Science and Engineering, The University of New South Wales.

Heiser et al., Resource Management in the Mungi Single-Address-Space Operating Systems, Aug. 1997, 15 pages, School of Computer Science and Engineering.

VxWorks® Programmer's Guide 5.3.1, Edition 1, Mar. 4, 1997 Wind River Systems, Inc., 648 pp.

* cited by examiner

| Entry # | Symbol | Symbol Address | Entry Point? |
|---|---|---|---|
| 0 | <symbol_name_0> | <address_0> | <y/n> |
| 1 | <symbol_name_1> | <address_1> | <y/n> |
| 2 | <symbol_name_2> | <address_2> | <y/n> |
| 3 | <symbol_name_3> | <address_3> | <y/n> |
| 4 | <symbol_name_4> | <address_4> | <y/n> |
| ... | ... | ... | ... |

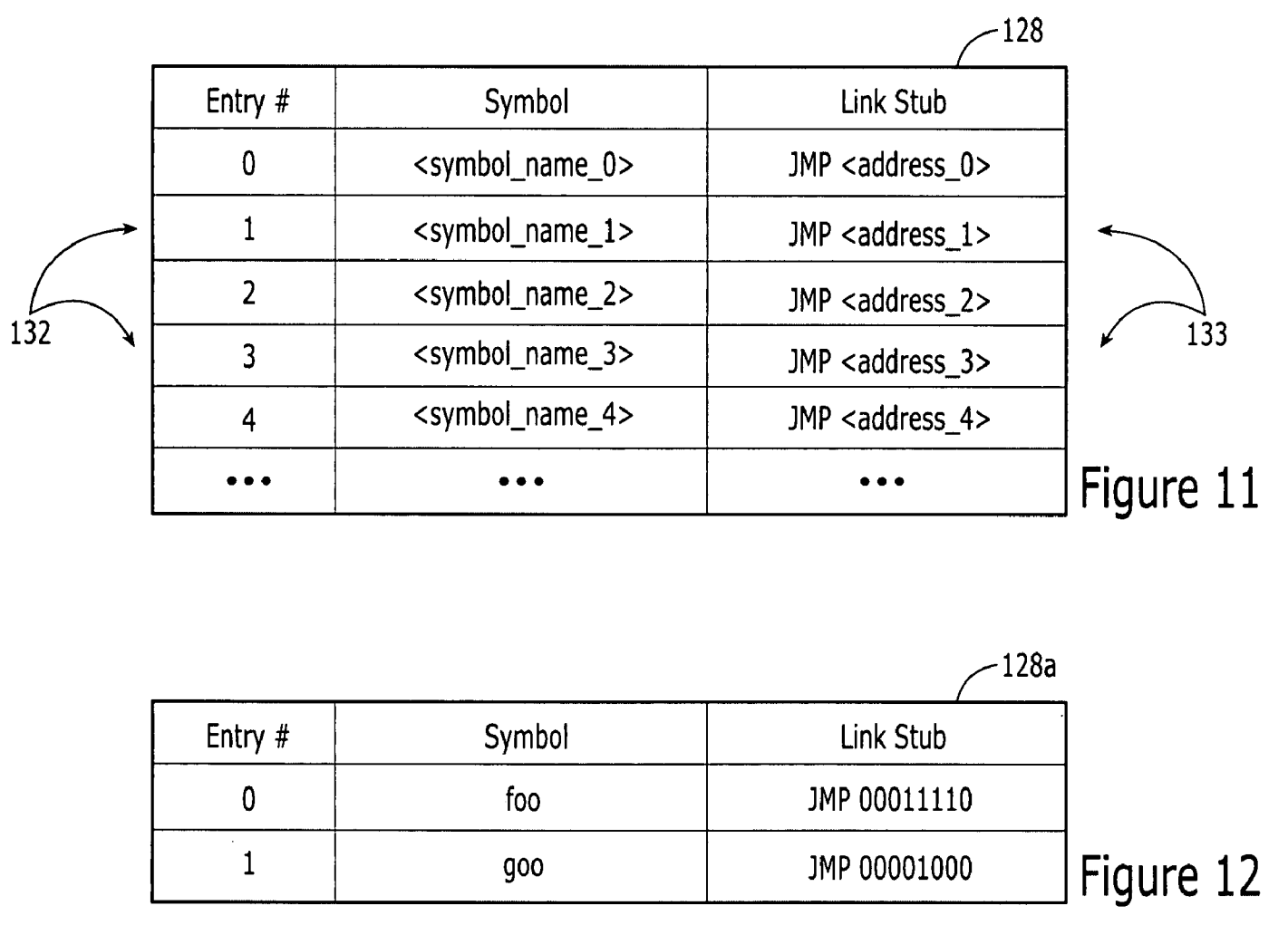

| Entry # | Symbol | Link Stub |
|---|---|---|
| 0 | <symbol_name_0> | JMP <address_0> |
| 1 | <symbol_name_1> | JMP <address_1> |
| 2 | <symbol_name_2> | JMP <address_2> |
| 3 | <symbol_name_3> | JMP <address_3> |
| 4 | <symbol_name_4> | JMP <address_4> |
| ... | ... | ... |

Figure 11

| Entry # | Symbol | Link Stub |
|---|---|---|
| 0 | foo | JMP 00011110 |
| 1 | goo | JMP 00001000 |

Figure 12

| Entry # | Symbol | Symbol Address | Entry Point? |
|---|---|---|---|
| ... | ... | ... | ... |
| 4 | foo | 00011111 | Y |

129b

PROTECTION DOMAINS FOR A COMPUTER OPERATING SYSTEM

BACKGROUND INFORMATION

Traditional multitasking operating systems (e.g., UNIX, Windows) have been implemented in computing environments to provide a way to allocate the resources of the computing environment (e.g., CPU, memory, Input/Output (I/O) devices) among various user programs that may be running simultaneously in the computing environment. The operating system itself comprises a number of functions (executable code) and data structures that may be used to implement the resource allocation services of the operating system.

Operating systems have also been implemented in a so-called "object oriented" manner. That is, when a particular function and/or data structure (defined by a "class" definition) is requested, the operating system creates ("instantiates") an "object" that uses executable code and/or data structure definitions specified in the class definition. Such objects thus may contain executable code, data structures, or both. Objects that perform actions are typically referred to as "tasks" (also known as "threads"), and a collection of tasks may be referred to as a "process." Upon loading and execution of the operating system into the computing environment, system tasks and processes will be created in order to support the resource allocation needs of the system. User applications likewise upon execution may cause the creation of tasks ("user tasks"), processes ("user processes"), and other objects in order to perform the actions desired from the application.

In order to protect the operating system and each task running in the computing environment from interference from other tasks also running in the computing environment, typical operating systems apportion the computing environment's execution "space" (e.g., its memory) into a "system" space and a "user" space. The system space includes the operating system tasks, while the user space includes any user tasks. Typically, operating systems are designed so that user tasks cannot directly access the memory apportioned to system tasks (and also may not access the memory allocated to other user tasks). The operating system itself, however, can access all portions of memory.

Conceptually, this "protection model" is illustrated by FIG. 1. In a computer system 1 controlled by an operating system 2, there may be any number of user processes 3 and system tasks 5 executing at one time. User processes 3 each include a number of user tasks 6. Because each user process 3 is only allocated a portion of the system memory, the operating system 2 may restrict access by any user task 6 affiliated with a particular user process 3 to the memory allocated to another process. Typically, however, system tasks 5 have unrestricted access to each other and each user process 3 (indicated by direct connections 7).

Additional protection may be provided by the CPU of the computing environment through the use of protected processing modes. For example, a CPU may provide "supervisor" and "user" modes of operation, where supervisor mode allows full use of all CPU instructions and facilities and user mode restricts the use of certain system critical instructions and facilities. Typical operating systems designate system processes to run in supervisor mode and user processes to run in user mode.

There may be instances, however, when a user task desires access to facilities controlled by the operating system. For example, a user task may want access to a network I/O connection, the control of which is delegated to a system task. In order to make such access, the user task is required to request execution of the system functions that perform the desired actions via a "system call", typically implemented via a special instruction used to cause the processor executing the code to "trap" to a trap routine (implemented in the system software) that makes a function call to the desired facilities of the operating system. Thus, the user task executing the system call cannot directly access the instructions and data structures of the system functions it wishes to execute, but rather must employ a special access procedure (represented in FIG. 1 as connections 4). Furthermore, since the user task is not permitted access to system resources, another task must be created by the operating system in the system space in order to perform the requested action. While this procedure protects the operating system from potential interference caused by user tasks, it increases system processing overhead (and thus increases execution time).

There may also be instances where it is desirable to allow a user process to access functions provided in other user processes. For example, it is desirable to implement applications in a modular fashion, and to re-use modules already implemented by other applications. Under traditional operating system implementations, such re-usable code modules (called "shared libraries") may be implemented in one of two ways. First, the shared library can be implemented in the user space, and any task that desires access to a function of the shared library may be allowed to directly call the function. This first implementation may be undesirable because it allows errant or malicious tasks to make changes to the shared library that may permanently corrupt the library. Second, the shared library can be implemented within the operating system space, and any user task that desires access to a function of the shared library must perform an indirect call to the system (the system call described above). Although implementing the shared library within the system provides protection from corruption, execution time is increased due to the overhead incurred from the system trap. Moreover, if the shared library software is not carefully designed and implemented, erroneous shared library functions can interfere with other system processes, potentially causing damage to the operating system.

Certain operating systems, called "real-time operating systems," have been developed to provide a more controlled environment for the execution of application programs. Real-time operating systems are designed to be "deterministic" in their behavior—i.e., responses to events can be expected to occur within a known time of the occurrence of the event, without fail. Determinism is particularly necessary in "mission-critical" applications, although it is generally desirable for all operating systems. Real-time operating systems are therefore implemented to execute as efficiently as possible with a minimum of overhead. As a result, prior real-time operating systems have typically employed relatively simplistic protection models for system and user process—typically all processes execute in the same space, thus allowing direct access to all system resources by all user tasks (system calls can be made directly, without a trap instruction). This protection model provides the fastest execution speed, but is deficient in providing system protection.

Certain operating systems have also been implemented in so-called "embedded" computing environments—for example, an electronic device that includes a computer system embedded within the device (e.g., automobiles, medical devices, cellular phones). Embedded computing environments tend to include less resources than standard "desktop" PC-type computing environments, for example, less memory may be used and a limited set of I/O devices may be supported. Embedded computing environments also tend to vary widely, using different CPUs and other hardware. As a result, operating systems used in embedded computing environments are designed to be portable across multiple processor environments and scalable to the particular hardware and functionality of the electronic device. The need for portability and scalability make its beneficial to implement the operating system using as little system space as possible and in a modular fashion. Real time operating systems (such as VxWorks® from Wind River Systems, Alameda, Calif.) are particularly suitable for use in the embedded computing environment.

While the simple protection model used in real-time operating systems was adequate for simple controlled implementations, the simple protection model impairs the use of real-time operating systems in more demanding computing environments. Such capability is desirable for use of the real-time operating system in the growing field of so-called "information appliances"—electronic devices that provide desktop PC-type applications in smaller, non-desktop PC-type devices (mobile phones, personal digital assistants, television set-top units, etc.) These information appliances can allow for the execution of application programs from vendors other than the maker of the appliance (which may be more complex than typical embedded applications), and may also allow for networking between the appliance and other systems. Users of such devices have a lower tolerance for system delays and failures as are prevalent in desktop PC systems. In such an environment, the ability to provide a protection model that prevents interference by malfunctioning and/or malicious tasks while maintaining high execution speeds, portability and system scalability is desirable.

SUMMARY OF THE INVENTION

According to an exemplary embodiment of the present invention, a computer system is described, comprising a system space having a number of memory locations and a number of protection domains, at least one of the number of protection domains owning a portion of the system space. Also according to the exemplary embodiment according to the present invention a protection domain is described, comprising a memory space and a protection view designating a set of protection domains for unrestricted memory access.

A first method is also described as part of the exemplary embodiment according to the present invention. The method includes loading a code module into a memory space of a first domain, the code module including an instruction having a symbol reference, and determining if the reference symbol is to an external location outside of the memory space. The method also includes generating a link stub for the symbol reference when the symbol reference is to an external location to access the external location, and redirecting the instruction to the link stub.

A second method is also described as part of the exemplary embodiment according to the present invention. The second method includes the steps of creating a task in a first domain, the task executing a number of instructions, executing a jump instruction in the number of instructions that refers to a link stub corresponding to an external location in a second domain, and executing the link stub.

A method for debugging a code module is also described as part of the exemplary embodiment according to the present invention. The method for debugging including the steps of loading a developmental code module into a protection domain in a computing environment, the protection domain having a protection view, the protection view being set to a first setting, and changing the protection view to a second setting to isolate the protection domain in the computing environment. The method also including the steps of performing a debugging operation using the developmental code module, and changing the protection view back to the first setting.

BRIEF DESCRIPTION OF THE DRAWINGS

FIG. 9 shows an exemplary symbol table of the protection domain of FIG. 4, according to the present invention.

FIG. 11 shows an exemplary linking table of the protection domain of FIG. 4, according to the present invention.

FIG. 12 shows a linking table implementing the example of FIG. 7, according to the present invention.

DETAILED DESCRIPTION

Figure 1:
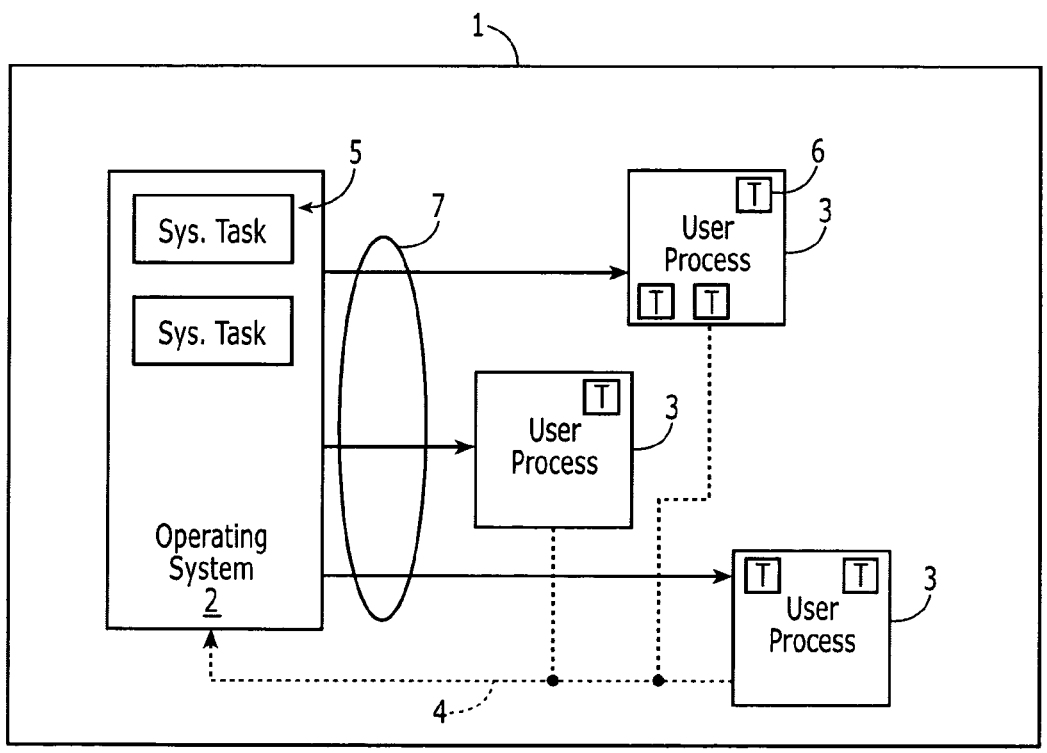
FIG. 1 shows a block diagram of a prior art protection model.

According to an embodiment of the present invention, a system is provided that implements a "protection domain" system. The protection domain system segregates the computing environment into a number of "protection domains." Each protection domain is a "container" for system resources, executable code and data structures, as well as for executing tasks and system objects (such as semaphores and message queues). Each resource and object in the system is "owned" by exactly one protection domain. The protection domain itself is a self-contained entity, and may be isolated from other system resources and objects to prevent tasks executing in the protection domain from potentially interfering with resources and objects owned by other protection domains (and vice versa).

The protection domain system also, however, provides mechanisms by which tasks executing in one protection domain may access resources and objects contained in a separate protection domain. Each protection domain includes a "protection view" that defines the system resources and objects to which it has access (i.e., the resources and objects which it can "see"). By default, each protection domain has a protection view that includes only the system resources and objects contained within that protection domain. However, a protection domain may acquire access to the resources of other protection domains by "attaching" to these protection domains. When a first protection domain has obtained "unprotected attachment" to a second protection domain, the second protection domain is added to the protection view of the first protection domain. Executable code in the first protection domain may use "unprotected links" to selected functions in the second protection domain, allowing tasks executing in the first protection domain to use the resources and access the objects of the second protection domain with a minimum of execution overhead. Executable code in the first protection domain may also be linked to data structures or specific memory addresses in the second protection domain without restriction.

Unrestricted access by all tasks executing in one protection domain to all the resources and objects of another protection domain may not be desirable, however, for reasons of system protection and security. The protection domain system provides a further mechanism whereby individual tasks executing in a first protection domain may access resources or objects contained in a second protection domain, but without adding the second protection domain to the protection view of the first protection domain. This access is achieved by "protected attachment" of the first protection domain to the second protection domain via a "protected link" between executable code in the first protection domain and selected functions in the second protection domain. Using the protected link, a task running in the first protection domain may, for example, make a direct function call to a function existing in the second protection domain, without the need to alter the protection view of the first protection domain. Tasks in the first protection domain are prevented from accessing the second protection domain except through this protected link, thus preventing unauthorized accesses of functions and data in the second protection domain. As will be described below, protected linking can be achieved without the need to use different code instructions for protected and unprotected accesses (increasing implementation flexibility), and without the need to create separate tasks in the protected protection domain to perform the desired actions.

This protection domain system according to the present invention allows the operating system to dynamically allocate system resources among processes and flexibly implements and enforces a protection hierarchy. This protection hierarchy can be formulated to control the impact of poorly written or malicious applications on the operating system and other applications running in the computer system, in a manner that is transparent to applications developers and incurs minimal execution overhead. The protection domain system can also enable modular software implementations and development without sacrificing system protection or incurring extensive overhead.

Figure 2:
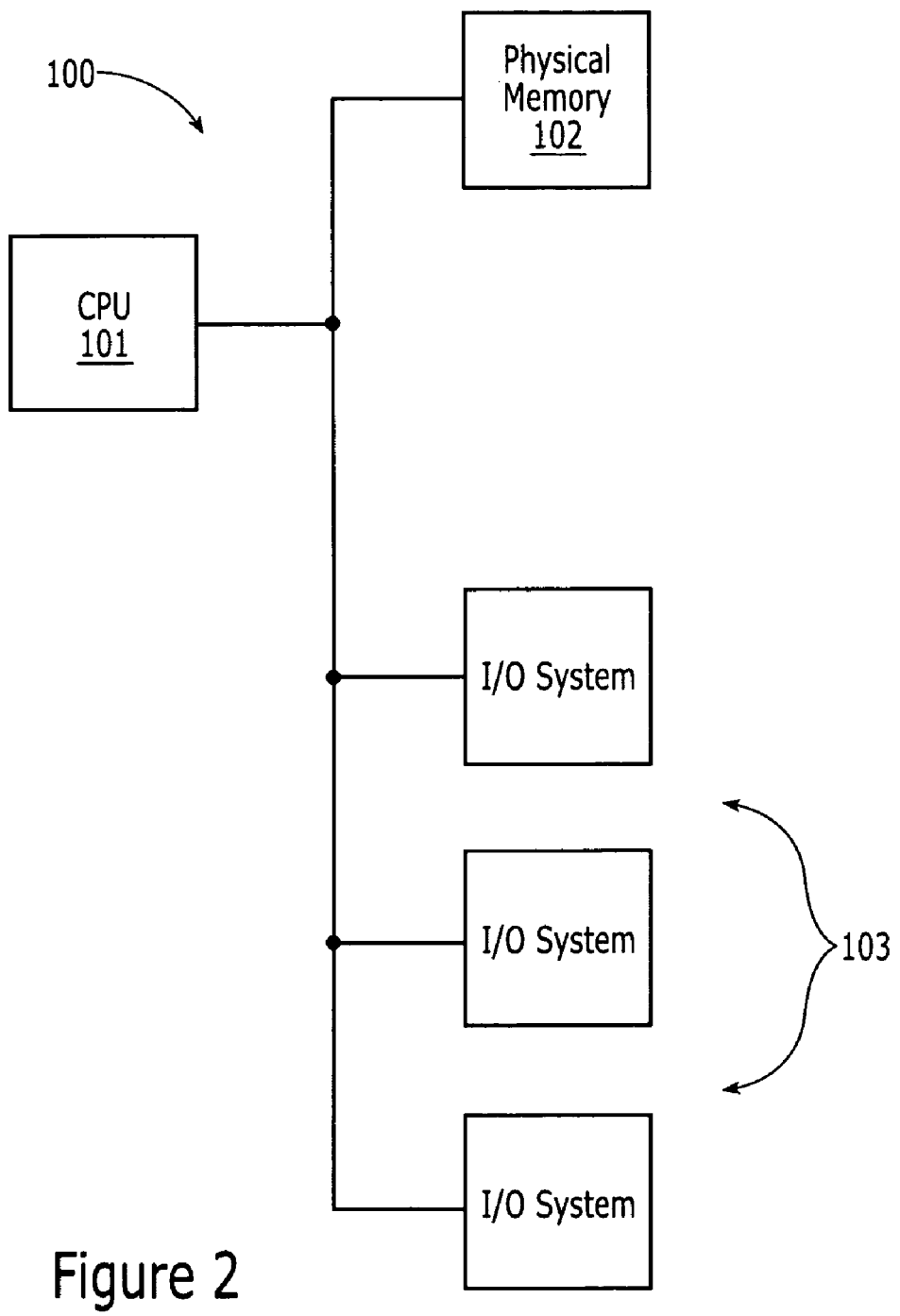
FIG. 2 shows a block diagram of an exemplary computer system according to the present invention.

An exemplary embodiment of a computing environment implementing a protection domain system according to the present invention is illustrated by FIGS. 2–18. FIG. 2 is a block diagram of an exemplary computer system 100. Computer system 100 includes a CPU 101, which is coupled to a physical memory system 102 and a number of I/O systems 103. Connection of the CPU 101 to the physical memory system 102 and the number of I/O systems 103 may be according to any of the well known system architectures (e.g., PCI bus) and may include additional systems in order to achieve connectivity. I/O systems 103 may comprise any of the well known input or output systems used in electronic devices (e.g., key pad, display, pointing device, modem, network connection). Physical memory system 102 may include RAM or other memory storage systems operational memory, and read only memory and/or other non-volatile storage systems for storage of software (an operating system, other applications) to be executed in computer system 100. Alternately, software may be stored externally of computer system 100 and accessed from one of the I/O systems 103 (e.g., via a network connection). CPU 101 may also include a memory management unit (MMU, not shown) for implementing virtual memory mapping, caching, privilege checking and other memory management functions, as is well known.

Figure 3:
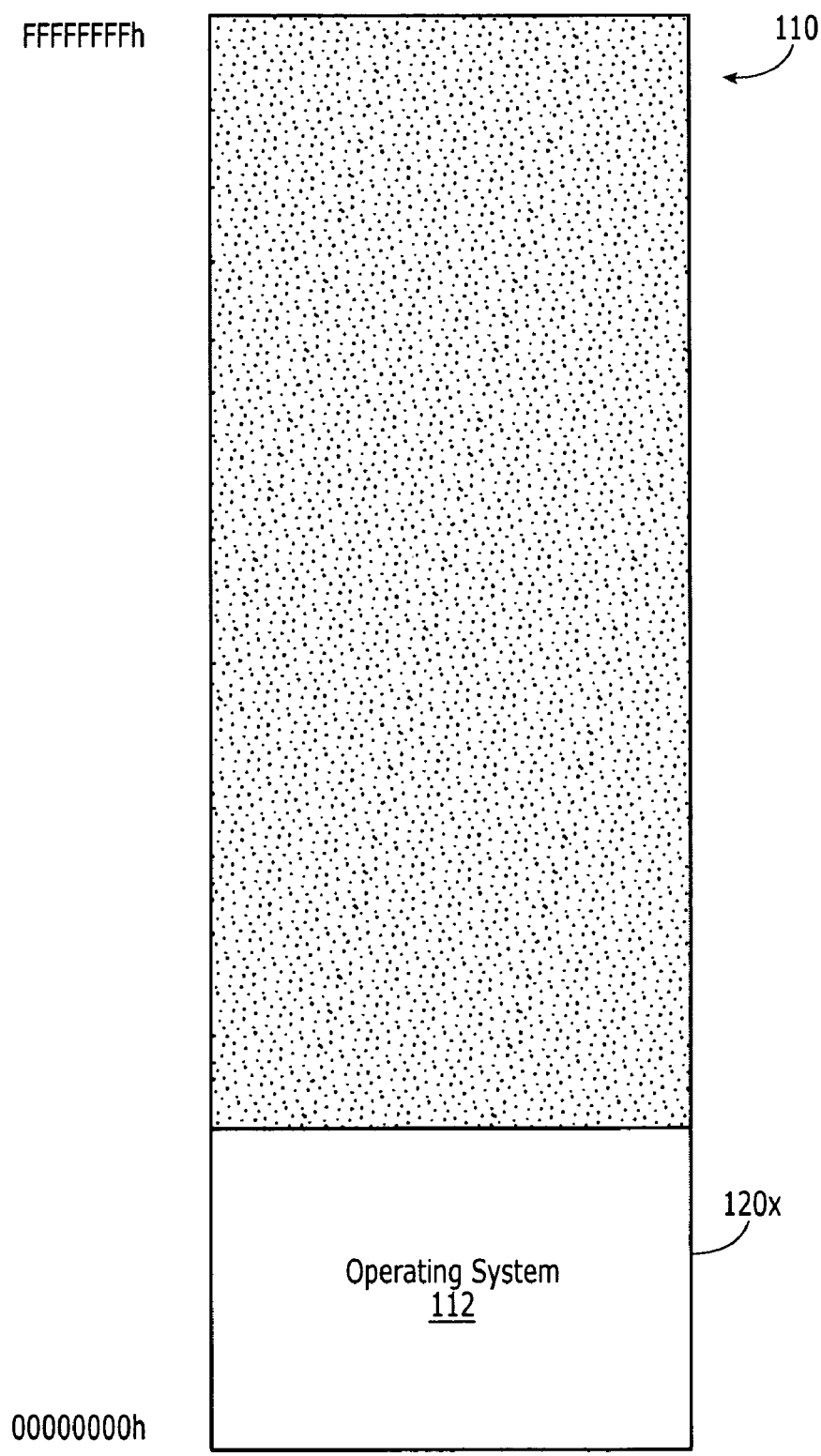
FIG. 3 shows an exemplary system space of the exemplary computer system of FIG. 2, according to the present invention.

FIG. 3 illustrates an exemplary system space 110 of exemplary computer system 100. System space 110 is, for example, an addressable virtual memory space available in the computer system 100 (which may be equal to or greater than the amount of physical memory provided in computer system 100, depending on system memory management implementations). System space 110 may also include memory locations assigned as "memory mapped I/O" locations, allowing I/O operations through the system space 110. As shown in FIG. 3, exemplary system space 110 includes addressable locations from 00000000h (hexadecimal) to FFFFFFFFh, defining a 32-bit addressable space. In this example, system space 110 is implemented as a "flat" address space: each address corresponds to a unique virtual memory location for all objects in the system space 110 regardless of the object's owner. Other known addressing methods may also be used.

System space 110 includes an operating system 112, which controls access to all system resources (such as physical memory system 102 and I/O systems 103). Operating system 112 includes executable code and data structures, as well as a number executing tasks and system objects that perform system control functions (e.g., context switching between tasks). Operating system 112 may be loaded into system space 110, for example, upon power up of the computer system 100, via a "bootstrap" loader.

Exemplary operating system 112 according to the present invention implements a protection domain system in which all resources and objects are contained within protection domains. The exemplary protection domain system is object oriented: each protection domain itself is actual a system object. The structure of each protection domain is defined through a protection domain "class" definition. A protection domain may be created, for example, by instantiating a protection domain object based on the protection domain class. Only the operating system 112 can create or modify (or destroy) a protection domain, although user tasks can request such actions through a protection domain application programming interface (API) provided by the operating system 112. A protection domain object is owned by the protection domain that requested its creation.

Figure 4:
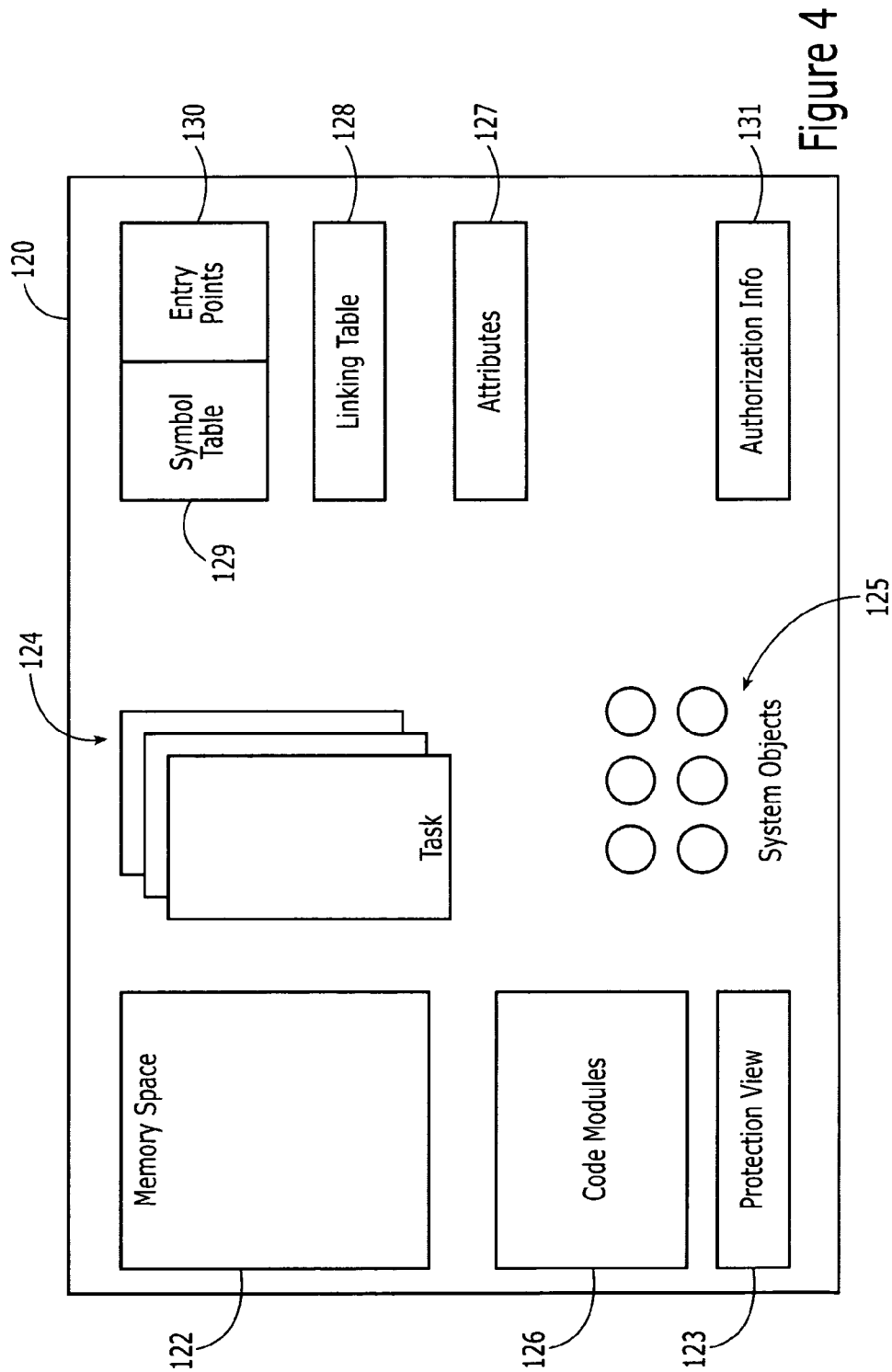
FIG. 4 shows a block diagram of an exemplary protection domain, according to the present invention.

FIG. 4 shows a logical block diagram of various components of an exemplary protection domain 120. The specific components capable of being "owned" by a protection domain may be specified in the protection domain class definition. Exemplary protection domain 120 may be considered the owner of one or more of the following components:

- a memory space 122,
- a protection view 123,
- zero or more code modules 126 containing executable code and/or data structures (including memory mapped I/O locations),
- a collection of protection domain "attributes" 127,
- a linking table 128 and a symbol table 129 including a list of entry points 130,
- zero or more tasks 124, and
- zero or more system objects 125 (e.g., semaphores, file descriptors, message queues, watchdogs).

Memory space 122 comprises a number of virtual memory locations from system space 110. These memory locations need not be contiguous, and may include memory mapped I/O locations. The amount of memory allocated to memory space 122 by operating system 112 may be specified at the time protection domain 120 is created. Additional memory may be dynamically allocated to memory space 122 by operating system 112 as needed from any free memory in system space 110.

Figure 5:
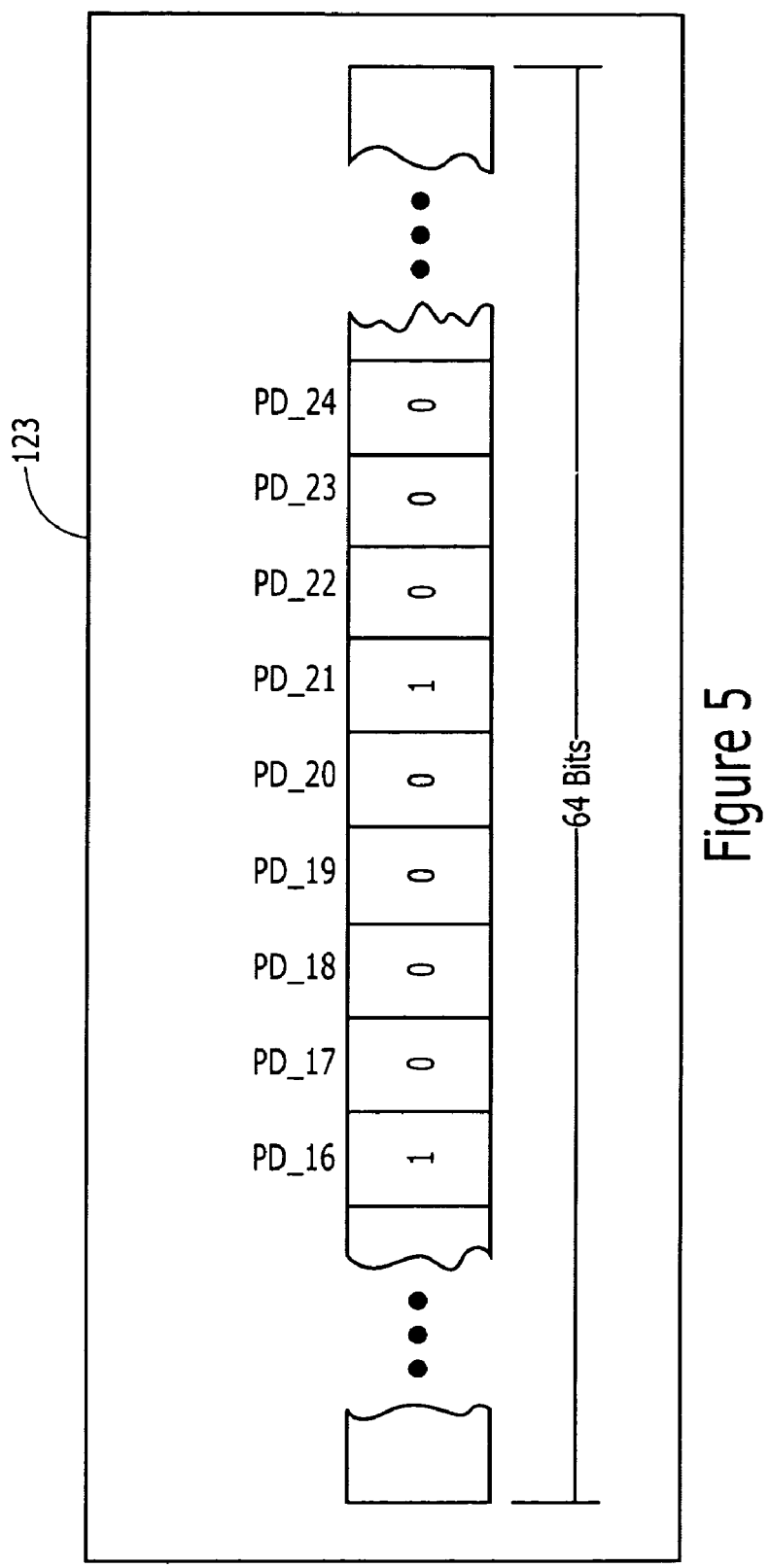
FIG. 5 shows an exemplary protection view data structure, according to the present invention.

Upon creation of protection domain 120, the protection view 123 of the protection domain 120 will be established. The protection view 123 represents the protection domains to which tasks executing in the protection domain 120 may have access. An exemplary protection view data structure 500 that may be used to represent the protection view 123 is illustrated in FIG. 5. Protection view data structure 500 is a bit map, in which each protection domain in system space 110 is represented by a single bit. Where a bit is set, the protection domain 120 has unprotected access to the corresponding protection domain in system space 110. Where a bit is not set, unprotected access is not permitted. Operating system 112 may maintain information for mapping each bit to an existing protection domain. The size of the bit map defines the maximum number of protection domains supported in the system space 110; in this example, sixty-four protection domains are possible. Note that other data structures could also be used to represent the protection view 123 which avoid this limitation.

The default condition for protection domain 120 is a protection view 123 that includes only the resources and objects of protection domain 120, and no other protection domains. In the exemplary bit map of protection view data structure 500, this default condition may be represented by setting the bit corresponding to protection domain 120, while leaving the remaining bits cleared (value zero). Protection domain 120 may expand its protection view 123 by being "attached" to other protection domains during the linking process when code modules or other objects are loaded into protection domain 120, which will be further described below.

Also upon creation of protection domain 120, a set of protection domain attributes 127 may be specified. These attributes may be used to control the actions allowed by tasks executing in protection domain 120, the linking permitted between protection domain 120 and other protection domains in the system space 110, and other characteristics of the protection domain 120. Among the protection domain attributes 127 supported by protection domain 120 are:

- the name of the protection domain
- the maximum memory size of the protection domain
- whether the protection domain may be linked to by code modules in other protection domains ("linkage control")
- the processor privilege mode that may be assigned to tasks created ("spawned") in the protection domain (e.g., user/supervisor), Other attributes may also be used, depending on the specific implementation of the protection domain system.

Also upon creation of protection domain 120, memory space 122 may be loaded with a number of code modules 126 (this loading may also be deferred until a later time). A code module 126 may contain executable code, data structures and/or other information to be used by a loader application during the loading process. The executable code will include a number of instructions, which may include instructions that reference other executable code or data structures outside of code module 126 (e.g., via a "jump" or "branch" instruction to execute a function). These references may be made using "symbols" that are intended to represent the memory location of the desired code or data structure. In order to determine ("resolve") the memory address value of these symbols, the loading of code modules 126 may include a linking process (described below) that attempts to resolve symbol references by searching for other occurrences of the symbol either in other code modules 126 already loaded into the protection domain 120, or in code modules loaded into other protection domains. Note that symbols may also include the memory address itself (in which case no resolution is needed, although other linking activities may still be performed, as described below).

Symbols that reference locations external to protection domain 120 indicate that a "link" is needed between protection domain 120 and the protection domain that owns the external location referenced by the symbol. Inter-protection domain linking is achieved through the use of linking table 128 and symbol table 129. An exemplary linking table 128 is shown in FIG. 11. A linking table entry 132 is provided for each symbol that requires an inter-protection domain link. The linking table entry includes the symbol itself, and a link stub 133, which comprises a number of executable instructions used to access the external location. A simple link stub may comprise only a jump instruction to cause a jump to the address of the external location, although additional instructions may be included in the link stub as needed to implement the protection goals of the system. As part of the loading and linking process (described below), instructions that include symbols referencing external locations are "redirected" to the linking table entry 132 corresponding to the symbol (and specifically to the link stub 133 corresponding to the symbol).

Symbol table 129 is used in conjunction with linking table 128. An exemplary symbol table 129 is shown in FIG. 9. A symbol table entry is provided for each symbol used in protection domain 120. The symbol table entry includes the symbol itself, the address for the memory location referenced by the symbol, and whether the symbol may be used as an entry point. Symbol table 129 may be used for linking within protection domain 120, as well as for inter-protection domain linking. Symbols that are permitted to be linked by code modules outside of protection domain 120 are indicated to be entry points 130, by specifying such in the entry point field of symbol table 129.

The linking table 128 and entry points 130 enable a number of beneficial features of the protection domain system. First, executable code does not have to be written to take into account any protection facilities, and can simply call external functions as if those functions were internal to the protection domain. The distinction between protected and unprotected accesses is not forced onto the code writer, but rather is a function of the protection domain. Second, addressing limitations of some instructions of some CPUs can be avoided, because all inter-protection domain function calls are handled through the linking table 128, not the instruction making the call. Third, the protection scheme can be enforced both when code modules 126 are linked (in the process of creating the linking table 128) and while tasks are running (using the link stubs 133).

Protection domain 120 may also include authorization information 131 that may be used, for example, in permission checking for attachment of protection domains and other security checking operations, as will be further described below.

Protection domain 120 may also own tasks 124 and system objects 125. Protection domain 120 may include no tasks (purely a data buffer or "passive shared library" of functions) or a number of tasks that either have been created ("spawned") in the protection domain 120 ("native" tasks) or are "visiting" protection domain 120 (i.e., native to another protection domain). Tasks may be spawned, for example, upon completion of loading and linking code modules 126 (described below). System objects 125 are created by the operating system 112 at the request of a task executing in protection domain 120. Such system objects 125 may include semaphores, message queues, and watchdog timers (as are well known), as well as other protection domains. The structure and operation of tasks in the protection domain system will be described in more detail below.

As mentioned previously, all system resources and objects are owned by a protection domain. The system space 110 will therefore include at least one protection domain—a protection domain that owns the code modules and other objects associated with the operating system 112. FIG. 3 shows operating system 112 contained within a single "system protection domain" 120x. Upon loading and execution of the operating system 112, one of the first actions performed during loading is to create the system protection domain. The system protection domain initially owns all system resources and objects, and ultimately owns all other protection domains created within the system space 110. The system protection domain 120x may have a protection view 123x that includes all protection domains in the system, so that any task executing in the system protection domain may access executable code and data in any protection domain.

Figure 6:
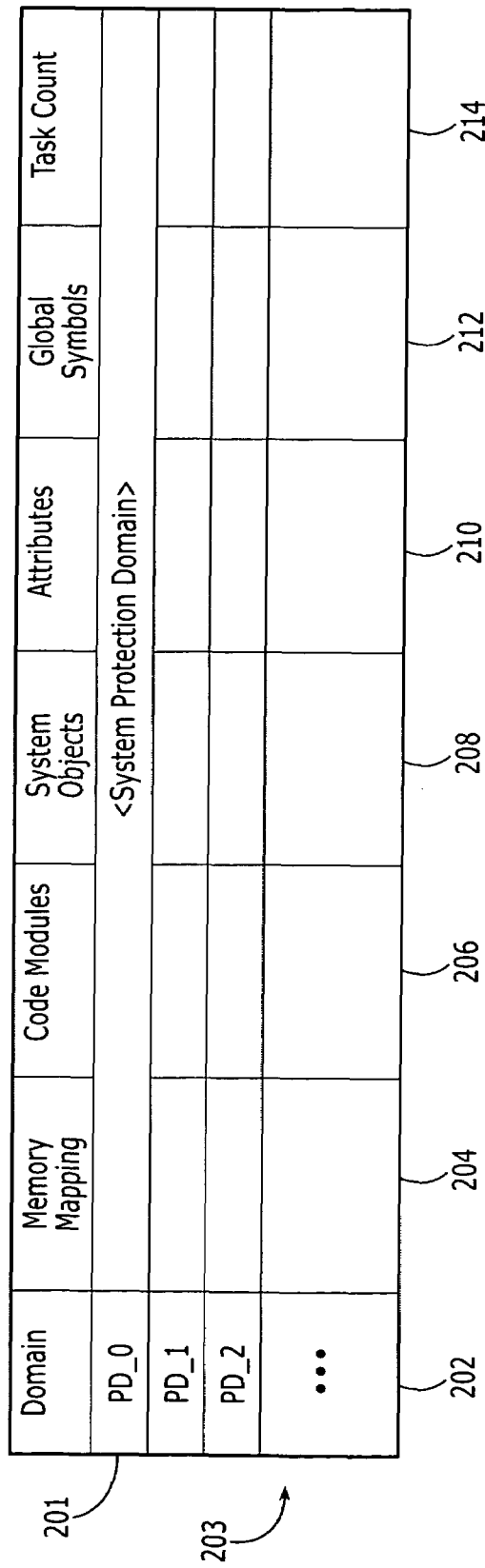
FIG. 6 shows an exemplary protection domain list data structure, according to the present invention.

In the current example, all protection domains 120 are objects that are created and maintained by the operating system 112. Accordingly, operating system 112 maintains a "protection domain list" data structure that tracks all protection domains currently in existence in the system space 110. FIG. 6 illustrates an exemplary protection domain list data structure 200. The protection domain list 200 includes a record 201 for the system protection domain object, and records for any other protection domain objects in existence. An exemplary record 203 in the protection domain list 200 may include entries for: the protection domain name (entry 202), memory mapping information for the protection domain (entry 204), a list of code modules downloaded into the protection domain (entry 206), a list of system objects owned by the protection domain (entry 208), the protection domain attributes 127 (entry 210), a list of global symbols provided by the protection domain (entry 212), and a count of the number of tasks executing in the protection domain (entry 214). Other information may be stored in the protection domain list 200, depending on the specific implementation of the protection domain system. Protection domain list 200 allows the operating system to reclaim resources used by a protection domain when the protection domain is no longer needed ("destroyed").

As mentioned above, the protection view represents the system resources available to objects in a particular protection domain (i.e., the resources and objects that can be "seen" in the protection domain). Each protection domain has a protection view that by default includes only its own memory space and system objects. In this default condition, the protection domain cannot access any resources or objects that exist in other protection domains. Thus, this limited protection view prevents direct linking of executable code to the resources and objects of other protection domains and prevents tasks executing in the protection domain from accessing the resources and objects of other protection domains, preventing possible corruption of the resources and objects of other applications or the operating system.

There may be instances when access to other protection domains is desirable. For example, an application may want to place a library of commonly used functions or a common data structure in a separate protection domain in order to allow other applications to access these functions and data structures (without allowing access to the application's own protection domain). Also, applications will need to access the system protection domain in order to access resources and objects controlled by the operating system 112. The protection domain system permits such access through a mechanism called "attachment," which may be employed when a code module is loaded into a protection domain and needs to link to executable code and other objects located outside the protection domain. Attachment may be unprotected, where the protection view of the protection domain is changed to include the attached protection domain, or may be protected, where only particular protected links are permitted between each protection domain.

The following discussion will illustrate some exemplary attachment mechanisms and exemplary processes by which unprotected links and protected links may be established between protection domains. The discussion will be directed to the general case of the implementation of the exemplary protection domain system, and to a specific example of an application 114 being loaded into system space 110 where operating system 112 has already been loaded and is executing in system protection domain 120x.

Figure 7:
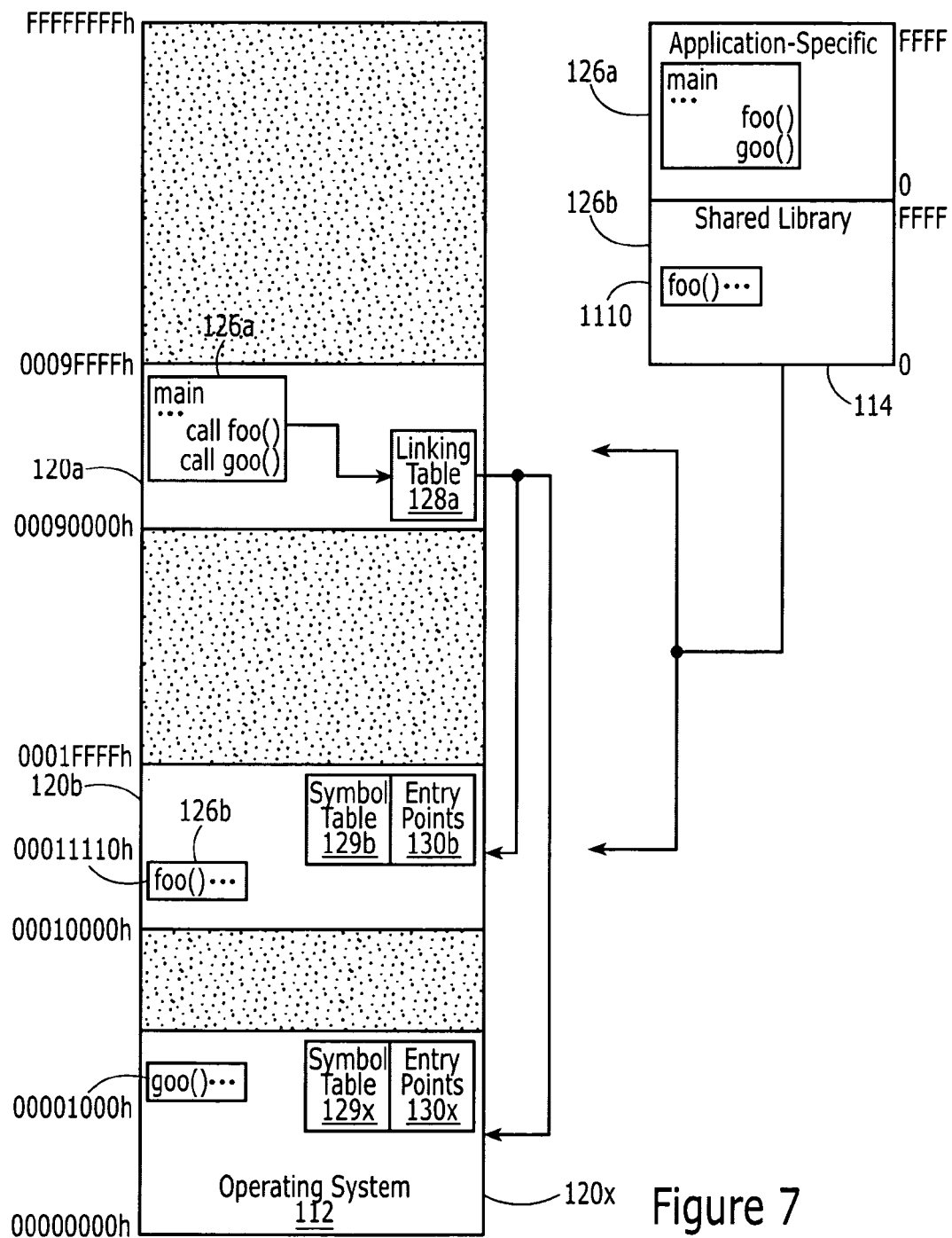
FIG. 7 shows an example of a system space loaded with an application, according to the present invention.

The specific example of the loading of application 114 is shown in FIG. 7. Application 114 comprises two code modules 126a, 126b (each having a size of 10000h bytes), which are each intended to use separate protection domains 120a, 120b: one for application-specific functions (executable code) and data structures, and one for storage of common functions and data (a "shared library") that will be used by the application 114 and possibly other applications later loaded. Code module 126a includes executable code that includes instructions that reference functions called "foo( )" and "goo( )," neither of which are part of code module 126a. Code module 126b includes executable code for the function "foo( )." Operating system 112 includes executable code for the function "goo( )." Since these functions "foo( )" and "goo( )" are not present in code module 126a, their calls are represented by a symbol (for example, the function name) that acts as a surrogate for the address of the memory location of the entry point for the function. Code module 126b will allow other code modules to link to its functions (such as "foo( )"), provided they provide proper authorization. Function "foo( )" has as its entry point a relative address of "00001110h" (i.e., relative to the first instruction in code module 126b), and code module 126b includes a symbol for foo( ) indicating this relative address. Operating system 112 will not permit access to its protection domain, but will allow calls to "goo( )" through protected linkage. Function "goo( )" has as its entry point an address of "00001000h".

Figure 8:
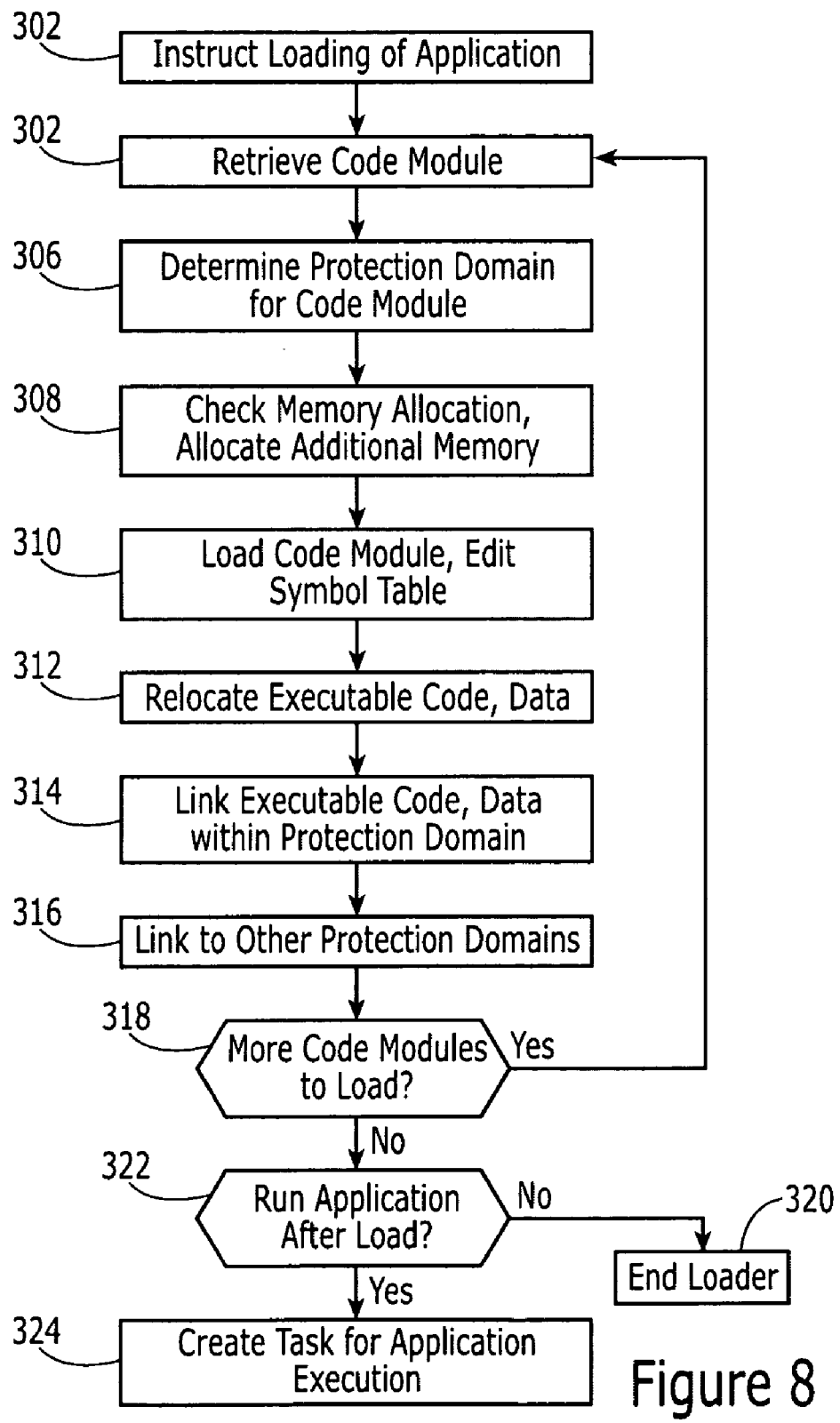
FIG. 8 shows a flow chart of an exemplary loading and linking procedure, according to the present invention.
Figure 10:
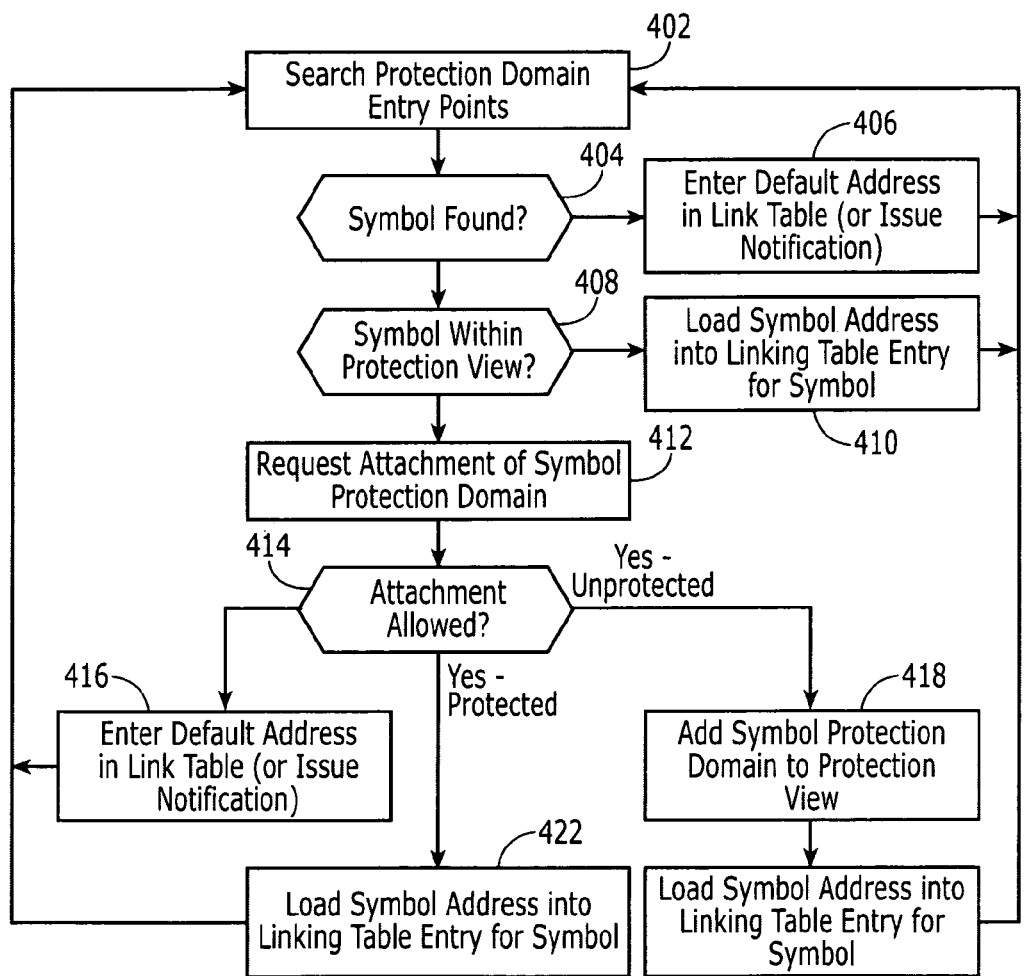
FIG. 10 shows a flow chart of an exemplary inter-protection domain linking process, according to the present invention.

FIG. 8 shows a flow chart of the exemplary loading and linking procedure. In step 302, the operating system 112 is instructed (either by a user or another application) to load the application into the system space 110. Operating system 112 includes a "loader and linker" application (usually referred to simply as a "loader") that may be used to perform the necessary loading and linking steps. Alternatively, the loader and linker can be implemented "offline" in a development system (as part of a system build or simulation). The instruction to perform the loading of application 114 causes the loader to begin execution. In step 304, a code module of the application is retrieved from either physical memory system 102 or I/O devices 103 (depending on where the application's code modules are stored). Code modules will be arranged in a particular format that permits the loader to perform loading and linking (well known examples being ELF, a.out, COFF, HP-SOM, PECOFF). Code modules for an application may also be ordered so that they are loaded in a specific manner (for example, to achieve proper linking). In this example, code module 126b of application 114 (the shared library) is the first code module retrieved from non-volatile storage of physical memory system 102.

In step 306, the protection domain 120 into which the code module will be loaded is determined. Code modules can be loaded into existing protection domains, or newly created protection domains (or protection domains built in the development system), which may be indicated by the instruction provided to perform the loading process or as part of the code module itself. Where a code module is being loaded into an existing protection domain, this determination may also include checking the protection domain attributes 127 to determine whether the target protection domain permits code module loading. In this example, new protection domain 120b is created for code module 126b by requesting that the operating system 112 create a new protection domain object. FIG. 7 shows protection domain 120b, indicating it has been allocated addresses 00010000h to 0001FFFFh. The addresses for this protection domain 120b are provided to the loader. Protection domain 120b is created with protection domain attributes 127b (not shown) that indicate that other protection domains may make unprotected attachment to the resources and objects of protection domain 120b.

In step 308, the memory allocation of the protection domain's memory space 122 is compared to the code module to determine if enough memory has been allocated. If additional memory is needed, a request is made to the operating system to allocate additional memory to the protection domain. In the present case, where protection domain 120b has been created as part of the loading of code module 126b, the memory needed can be specified as part of the protection domain creation request.

In step 310, the code module is loaded into the memory space 122 of the protection domain. The actual memory locations that will receive the executable code and data structures of code module can be determined based on the size of the memory space, the presence of other code modules in the memory space, and other system-specific factors. In this example, code module 126b is loaded into protection domain 120b such that the executable code for function foo( ) begins at address 00011110h.

Figures 13, 14:
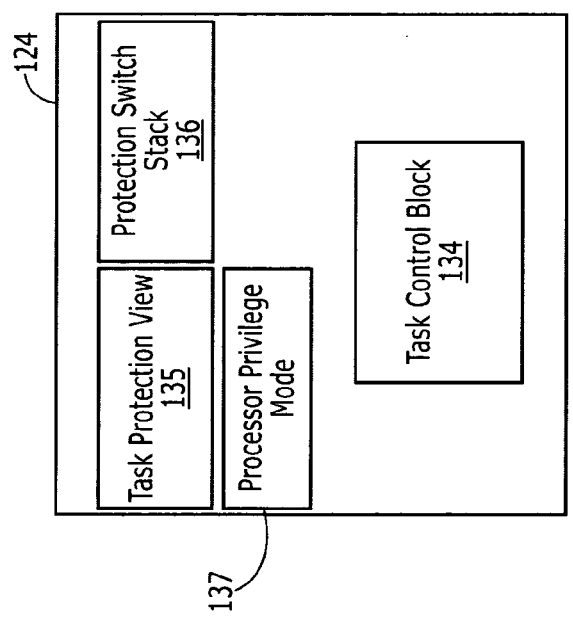
FIG. 13 shows a symbol table implementing the example of FIG. 7, according to the present invention.
FIG. 14 shows a block diagram of an exemplary task of the protection domain of FIG. 4, according to the present invention.

Loading also causes the protection domain's symbol table 129 to be updated to include symbols identified in the code module. A symbol table 129b used in the present example for protection domain 129b is shown in FIG. 13. In this case, the symbol for the function "foo( )" is loaded into symbol table 129b, along with its corresponding address (which at this point is still its relative address—"00001110") and an indication that it is an entry point 130b for external linking.

In step 312, the executable code of the code module is "relocated" based on its actual memory address. When the code module is loaded into the protection domain's memory space 122, address "offsets" are generated that represent the quantity that should be added to memory references in the executable code in order to reflect the actual memory locations of the referenced items. Alternately, a code module may specify it can only be loaded into particular memory locations (unrelocatable code), which can be indicated to the operating system in step 306 so that the desired memory locations can be allocated. The protection domain symbol table 129 is updated to include the actual addresses of the symbols of the code module. In this example, an offset of "00010000" is added to each memory reference in code module 126b and to each entry in symbol table 129b (including "foo", which now has a corresponding address of "00011110", matching its actual entry point).

In step 314, the executable code of the loaded code module is "linked." Linking involves resolving addresses for symbols referenced in the executable code of the code module. The executable code is parsed and symbols are compared against the protection domain symbol table 129. When a symbol is found in the symbol table 129, the corresponding address for the symbols is substituted for the symbol in the executable code. When the symbol is not found in the protection domain symbol table 129, a linking table entry 132 is created in the protection domain linking table 128, indicating that the executable code is referencing an external location outside of the protection domain 120. The address of the linking table entry 132 is then substituted for the symbol in the executable code. If a linking table entry 132 for the unresolved symbol already exists, that linking table entry may be used. In this case, no external function calls are made by the executable code of code module 126b, so no linking table entries are made in linking table 128b.

In step 316, inter-protection domain links are created using the protection domain linking table 128. The details of this procedure are discussed below (in the discussion of the linking of code module 126a).

Once the code module has been loaded and linked, the loader determines whether additional code modules need to be loaded (step 318). If not, the loader execution is complete (step 320). Alternatively, the loader can be instructed to begin execution of the loaded code modules by requesting the creation of a task (step 322). In such a case, the operating system 112 can create a task owned by the protection domain, executing in the protection domain using the executable code of the loaded code module. In this example, code module 126a still needs to be loaded, so the loader repeats steps 304–318 in order to load code module 126a.

The loading of code module 126a (the application specific executable code and data structures) begins by retrieving code module 126a from non-volatile memory system of physical memory system 102 (step 304). In this example, since code module 126a specifies that creation of a new protection domain is needed to hold it, protection domain 120a is created (step 306) via request to operating system 112. This protection domain 120*a* is allocated memory addresses "00090000" to "0009FFFF" (step 308), corresponding to the size of code module 126*a*. The executable code and data structures of code module 126*a* are loaded into memory space 122*a* of protection domain 120*a* (step 310), and any internal symbols are entered in symbol table 129*a*. No entry points are provided by code module 126*a*, so none of the entries in symbol table 129*a* are designated as entry points 130*a*. Memory references and symbol corresponding addresses are adjusted using the offset "00090000" (step 312).

In step 314, the executable code of code module 126*a* is linked to resolve symbol addresses. References to internal symbols are resolved based on the symbol table 129*a*. Symbols not found in symbol table 129*a* generate linking table entries 132 in linking table 128*a* for inter-protection domain references, and the addresses for the entries in linking table 128*a* are substituted for the symbols in the executable code.

In step 316, inter-protection domain links are created using the protection domain linking table 128. The sub-steps of this process are shown in the flow chart of FIG. 10, and will be first explained as applied to a generic protection domain 120 and then as applied to the example of FIG. 7. In step 402, the symbol name from an unresolved entry in a protection domain's linking table 128 is used to search the symbol tables 129 of each protection domain 120 for a matching symbol. This search may be simplified by maintaining a "global" symbol table for all entry points exposed by protection domains in the operating system. If no match is found (step 404), a default address is entered for the symbol in the link stub 133 of the linking table entry 132 for the symbol, indicating that no link has been established (step 406), and any remaining linking table entries 132 are processed. Alternately, an error may be generated causing the loading process to abort or, if the linking process is being performed on an development system, a notification can be provided indicating that no link has been established for the symbol.

When a match is found, the protection view 123 of the protection domain is checked to determine if the corresponding address for the symbol is within the protection view of the protection domain (step 408). If so, the corresponding address for the symbol is inserted into the link stub 133 of the linking table entry 132 for the symbol (step 410). If the symbol address is outside the protection view of the protection domain, a request is made to the operating system 112 to permit attachment to the protection domain containing the symbol (step 412). This request may include protection domain authorization information 131, which can be used to verify the authority to make an attachment. The operating system 112 consults the protection domain list 200 to determine the protection domain attributes 127 of the protection domain to which attachment is being requested (step 414). If no attachment is permitted, a default address is entered for the symbol in the link stub for the symbol's linking table entry, indicating that no link has been established (step 416), and any remaining linking table entries are processed. Alternately, an error may be generated causing the loading process to abort or, if the linking process is being performed on an development system, a notification can be provided indicating that no link has been established for the symbol.

If the protection domain containing the symbol permits unprotected attachment by the requesting protection domain, the protection view 123 of the requesting protection domain is altered to include the symbol's protection domain (step 418). The corresponding address for the symbol is then inserted into the link stub of the linking table entry for the symbol (step 420), and any remaining linking table entries are processed. If the protection domain containing the symbol permits only protected attachment by the requesting protection domain, the protection views of the protection domains are not altered, but the corresponding address for the symbol is still inserted into the link stub of the linking table entry for the symbol (step 422), and any remaining linking table entries are processed. Note that by not adding the protection domain of the symbol to the protection view of the calling code module, the memory address for the symbol will be outside of the memory accessible by the protection domain of the calling code module.

Applying the inter-protection domain linking steps described above to the linking of code module 126*a*, the entry points 130 for all protection domains are searched for the symbol "foo" (step 402), which is the first entry in linking table 128*a* (see FIG. 12). "Foo" is found (step 404) in the symbol table 129*b* of protection domain 120*b* (the shared library, see FIG. 9), which has not yet been added to the protection view 123*a* of protection domain 120*a* (step 408). Attachment of protection domain 120*b* to protection domain 120*a* is requested (step 412), and unprotected attachment is granted (step 414). Protection domain 120*b* is added to the protection view 123*a* of protection domain 120*a* (step 418). The corresponding address for the symbol "foo" is inserted into the link stub of the linking table entry for the symbol "foo" (step 420), such that the link stub for the linking table entry for the symbol "foo" will now perform a jump to the corresponding address "00011110" (which is the location of the function "foo" in the memory space 122*b* of protection domain 120*b*).

The process is repeated for the linking table entry for symbol "goo" in linking table 128*a*. The entry points 130 for all protection domains are searched for the symbol "goo" (step 402). "Goo" is found (step 404) in the symbol table 129*x* of protection domain 120*x* (the system protection domain), which has not been added to the protection view 123*a* of protection domain 120*a* (step 408). Attachment of protection domain 120*b* to protection domain 120*x* is requested (step 412), however system protection domain 120*x* does not permit unprotected attachment to its resources, and will only grant protected attachment (step 414). As a result, the corresponding address for the symbol "goo" is inserted into linking table 128*a* (step 420), such that the link stub for the linking table entry for the symbol "goo" will perform a jump to the corresponding address "00001000" (which is the location of the function "goo" in the memory space 122*x* of system protection domain 120*x*). The protection view of protection domain 120*a*, however, is not altered.

Once the code module 126*a* has been loaded and linked, the loader determines whether additional code modules need to be loaded (step 318). Since no more code modules are specified by application 114, the loader execution is complete (step 320). Alternatively, the loader can be instructed to begin execution of the loaded code modules by requesting the creation of a task (step 322). In such a case, the operating system 112 can create a task owned by the protection domain, executing in the protection domain using the executable code of the loaded code module (step 324).

The exemplary loading and linking process provides system protection by using the protection domain system to prevent improper or unauthorized linking against the contents of protection domains. Thus the loading and linking process provides a method to enforce the system protection provided by the protection domain system at the time of the loading and linking of applications.

The protection domain system also provides beneficial system protection during the course of application execution. Tasks executing in the system space 110 using the protection domain system are prevented from making unpermitted accesses of memory locations outside of the specified protection view, thus further protecting the system from erroneous or malicious accesses that may not have been eliminated during the linking process.

FIG. 14 illustrates the composition of exemplary task 124 used in the protection domain system. Each task 124 includes a task control block 134 that maintains various contextual information used during the execution of the executable code which task 124 is being used to run (for example, the task stack). Each task also contains a task protection view 135, which takes a similar structure to the protection domain protection view 123 (in this example, a bit map). Upon creation, task 134 begins with a task protection view that matches the protection view 123 of its owner protection domain. As will be described, the task protection view 135 of each task may change through the use of a "protection switch." Each task 134 will also include a protection switch stack 136 (which is used in the protection switch), and a processor privilege mode setting 137. A task may operate in the processor privilege mode allowed by its owner protection domain.

The following example will illustrate the execution of an exemplary task 124a spawned in protection domain 120a to execute application 114. Task spawning may occur at the completion of the loading and linking process for application 114, or at a later time through a request to the operating system 112 to create a task object. Task 124a is initialized to execute the executable code of code module 126a. Task is also initialized with a task protection view 135a equal to the protection view 123 of protection domain 120a, which in this case includes protection domain 120b.

Eventually, execution of task 124a will reach the instruction that references the function foo( ). The linking process has redirected this reference to the link stub 133 for the symbol "foo" in linking table 128a, which causes a direct jump to the location "00011110" (see FIG. 12), which is the entry point for the function "foo( )." Since protection domain 120b is within the protection view 123a of protection domain 120a, the jump to the memory location for function "foo( )" is within the permissible address range for memory accesses (which may be enforced, for example, by the MMU of CPU 101). Task 124a continues execution in protection domain 120b, executing the function "foo( )." When execution of the function "foo( )" has completed, task 124a returns to protection domain 120a and continues executing the executable code of code module 126a. Note that the only additional overhead that has been incurred using the protection domain system has been the additional link stub, which is minimally a single jump instruction.

Execution of task 124a will eventually reach the instruction that references the function "goo( )," which will cause a redirection to the linking table 128a, and execution of the link stub for the symbol "goo." The link stub for "goo" attempts a jump to location "00001000" (see FIG. 12). However, memory location is allocated to the system protection domain 120x, which is not in the protection view 135a of task 124a. As a result, the jump to address "00001000" causes the generation of a processor exception for a memory fault. This exception causes the execution of an exception handling routine in the operating system 112 to deal with the memory fault exception. This exception handling routine implements the instructions that allow the task to "switch" to a protection domain outside of the task's protection view.

Figure 15:
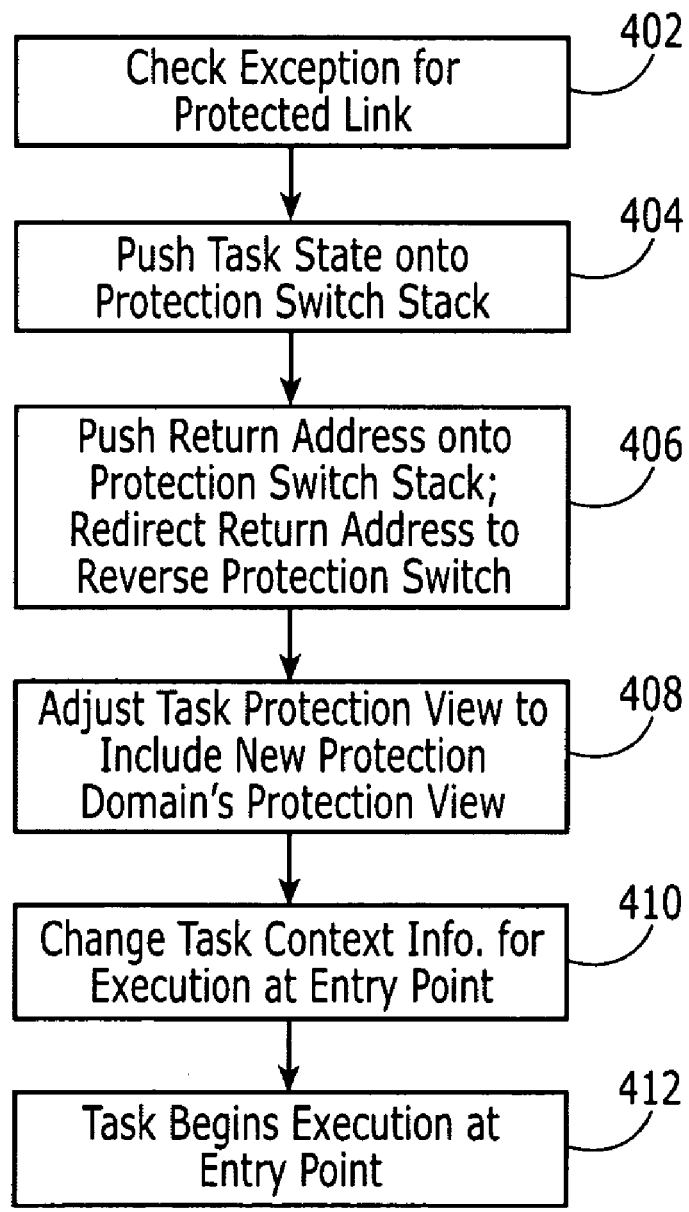
FIG. 15 shows a flow chart of an exemplary exception handling routine according to the present invention.

FIG. 15 shows a flow chart of an exemplary exception handling routine that implements the protection switch for the task 124a. In step 402, the nature of the exception is examined to determine if the exception was caused by the use of a protected link (for example, using a boundary check). If the exception is a "true" memory error, a separate routine to deal with such errors is executed (as is well known). If the exception was caused by the use of a protected link, state information about the current state of task 124a is pushed onto the task protection switch stack 136a (step 404). This state information may include the current (pre-exception) task protection view, the protection domain in which the task was executing prior to the exception, and the current processor privilege mode of the task. Saving the task's protection view and processor privilege mode allows the task protection view 135a and privilege mode 137a to be temporarily altered without losing its prior settings. In step 406, the return address for the function call (located on the task's task stack) is saved on the protection switch stack 136a, and this return address is "redirected" to a "reverse protection switch" routine that will be used to undo the protection switch after the task has finished executing in the new protection domain. The reverse protection switch may be implemented in the called protection domain, or may be implemented in the operating system 112.

In step 408, the task protection view 135a is changed to include the protection view of protection domain owning the memory location to access—in this case, the protection view 123x of the system protection domain 120x. The privilege mode of task 124a is also changed, if the privilege mode of the called protection domain is different that the task's native privilege mode. In step 410, the exception handler sets the context information in task control block 134a so that the next instruction executed by the task is the requested entry point—in this case, memory location "00001000," the entry point for function "goo( )." In step 412, execution of task 124a recommences at the requested entry point—here the function "goo( )."

Once execution of function "goo( )" is completed, the reverse protection switch may employed to return the task 124a to its previous protection domain. The protection switch stack 136a is unwound, popping the return address for the function call and the pre-exception state information (task protection view, protection domain, processor privilege mode). The pre-exception state information is used to restore the task state information to pre-exception values, and execution is passed to the return address for the function call (for example, an instruction subsequent to the function call).

The exemplary protection switching mechanism described above allows a single task 124 to execute between any number of protection domains—whether a protected or unprotected attachment exists—without the use of different calling instructions in the executable code for either type of attachment. There is no need to instantiate additional tasks in each protection domain, since tasks may "visit" each protection domain having resources to which access is needed. No complex and lengthy message passing schemes need to be implemented. Furthermore, because the protected link only causes the task protection view to be switched to include the protection domain of the called function, any other tasks also executing in the task's protection domain still cannot access the protection domain of the called function without using the protected link, thus protecting against unrestricted accesses.

Figure 16:
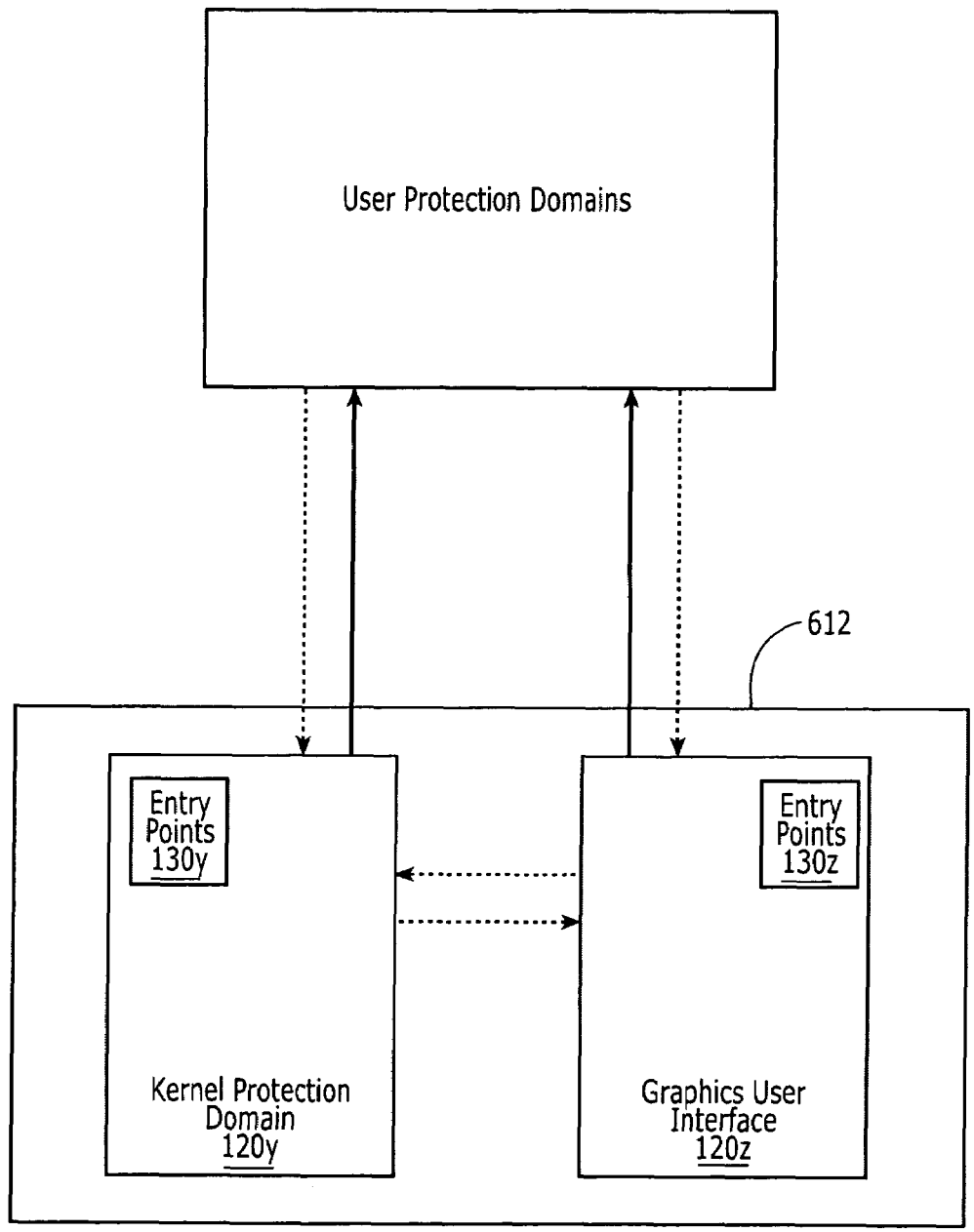
FIG. 16 shows an operating system employing two protection domains, according to the present invention.

Among the many implications of the protection domain system according to the present invention is that the operating system need not be implemented as a single, monolithic entity for protection purposes. The operating system itself can be divided into a number of protection domains, each of which employs protected links to allow access by user tasks, and system tasks. FIG. 16 illustrates an example of an operating system 612 which employs two protection domains: a kernel protection domain 120$y$ and a graphics protection domain 120$z$. Kernel protection domain 120$y$ owns the core operating system code and objects (e.g., interrupt service routines), while graphics protection domain 120$z$ owns the executable code and other objects related to a graphical user interface (GUI) of the operating system 612. Kernel protection domain 120$y$ may provide access to its features via protected linking to entry points 130$y$ (which correspond to a kernel API provided by the operating system 612). Likewise, graphics protection domain may provide access to its features via protected linking to entry points 130$z$ (which corresponds to a GUI API provided by the operating system 612).

Separating operating system tasks is beneficial in a number of ways. It is possible to design the operating system in a modular fashion, such that only those modules which are needed in the computer system are implemented, which reduces the operating system's "footprint" for those computer systems that are small and do not require certain operating system services. Also, by dividing the operating system into smaller protection domains, erroneous code executing in one portion of the operating system is less likely to corrupt other areas of the operating system that are in separate protection domains.

Another implication of the protection domain system according to the present invention is the ability to dynamically define the linkages (and thus the level of protection) between protection domains. The exemplary attachment mechanisms described above—unprotected linking and protected linking—both use the same calling instruction for function calls in any executable code written for use in the protection domain system. For example, executable code written in the protection domain system described above can use, for example, a jump instruction to a called function, regardless of whether an unprotected link or protected link is allowed. One of the ways in which the protection feature is enforced is at run time (i.e., when tasks are executing) is by comparing the function call against a protection view of the task executing the function call. Thus, whether the link is protected or unprotected may be dependent on the protection view of the particular task which is making the call.

Figure 17:
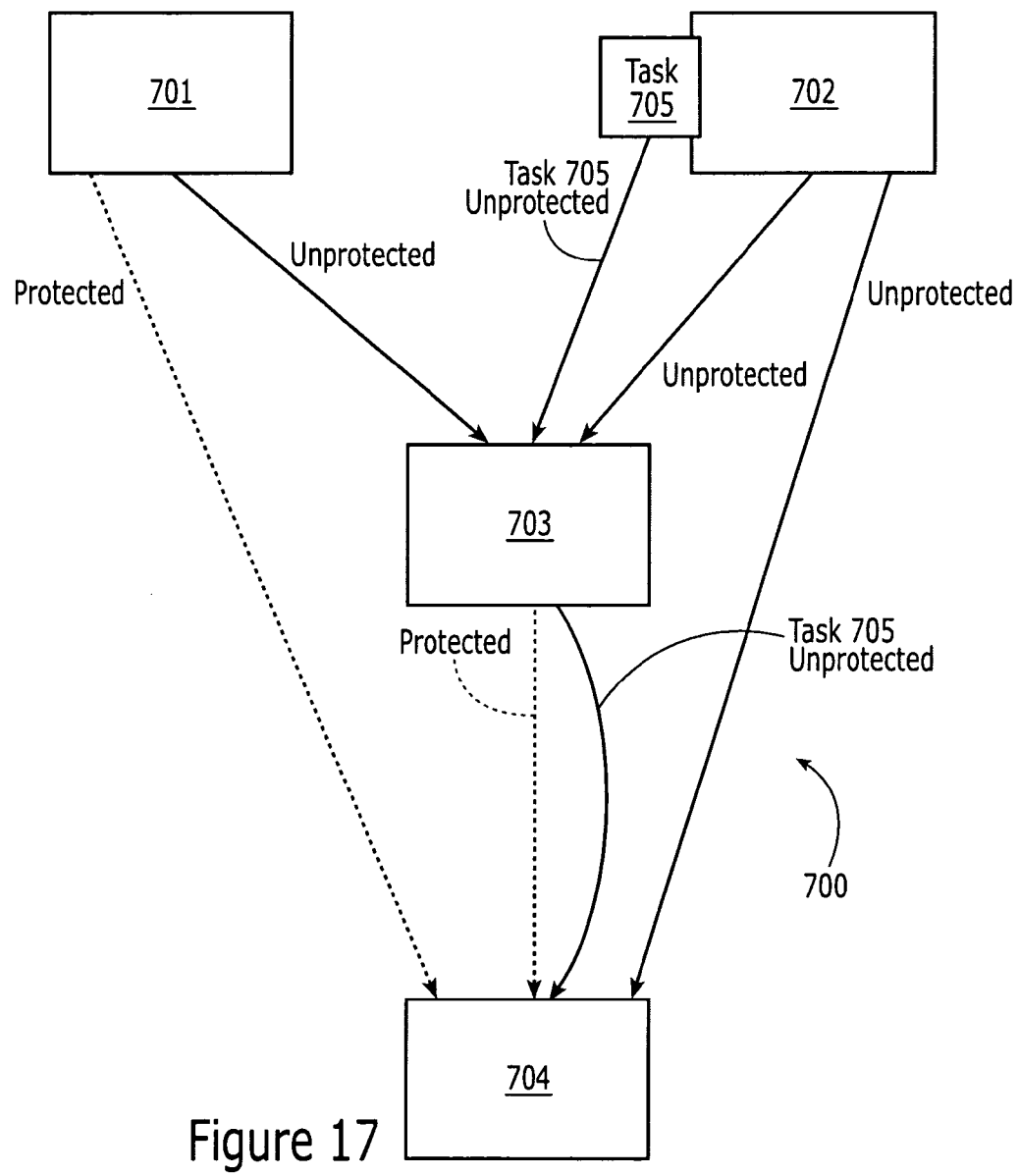
FIG. 17 shows a block diagram of multiple protection domains illustrating a dynamically defined protection feature, according to the present invention.

FIG. 17 shows a block diagram of multiple protection domains illustrating the dynamically defined protection feature. Exemplary space 700 includes four protection domains 701–704. Protection domain 701 contains executable code for a first application, and has a protection view that includes protection domain 703 (a shared library of functions) but not protection domain 704 (an operating system kernel). Protection domain 702 contains executable code for a second application, and has a protection view that includes protection domain 703 and protection domain 704. Protection domain 703 (which contains executable code for the shared library) does not have a protection view of any other protection domains. In this scenario, at link time, unprotected links exist between protection domain 701 and protection domain 703, protection domain 702 and protection domain 703, and protection domain 702 and protection domain 704. Protected links exist between protection domain 701 and protection domain 704, and protection domain 703 and protection domain 704.

A task 705 is created in protection domain 702 to run the executable code of the second application. Task 705 has a task protection view identical to that of protection domain 702; that is, task 705 has a task protection view that includes protection domains 703 and 704. Task 705 may call a function in the shared library of protection domain 703, which is then executed over the unprotected link between protection domain 702 and protection domain 702. If the called function in the shared library then calls a function in protection domain 704 (i.e., a system function), the protection view of task 705 is checked as part of the function call. Because task 705 has a task protection view that includes protection domain 704, the function call to protection domain 704 is by unprotected link (e.g., no exception is generated), rather than by protected link as was the case before task 705 executed. Note that if the executable code of protection domain 703 was required to use different instructions to implement protected or unprotected linkage, task 705 would either be forced to use the linkage existing at link time (in this example, a protected linkage), or a separate protection domain (using a copy of the shared library of protection domain 703) would need to be created to provide the unprotected link for task 705 (thereby increasing system resource usage).

Another implication of the protection domain system according to the present invention is the ability to flexibly configure the protection hierarchy of various protection domains in a computer system. Certain applications running in a computing environment may be more "trusted" than others—for example, applications written by certain programmers or vendors may be considered more "fault-proof" than others. Trusted applications, which are less likely to cause system corruption, may be allowed to make unprotected access, for example, to operating system functions, thus allowing these trusted applications to execute with low overhead in as fast a manner as possible. Untrusted applications may be allowed to make only protected access to system functions. The level of protection that is enforced against a particular application can be realized using the features of the protection domain system. Trusted applications can be described as being "privileged," in the sense that the application is privileged to make unprotected accesses to sensitive system resources (not in the sense of processor protection mode, although privileged applications may execute using a privileged processor mode as well).

FIG. 17 also illustrates an example of the flexible protection hierarchy feature for privileged applications. The first application has executable code contained in protection domain 701 and the second application has executable code contained in protection domain 702. The first application is not a trusted application, but the second application is a trusted application. Accordingly, the protection view for protection domain 701 (containing the untrusted first application) is set such that tasks running executable code for the first application cannot use unprotected links to the system functions in the kernel contained in protection domain 704, but rather must use protected links. The protection view for protection domain 702 however (which contains the executable code for the "privileged" second application), includes protection domain 704. Therefore, tasks running executable code from the second application can use unprotected links to the system functions in the kernel (and can perform memory accesses to other locations in the kernel). This hierarchy allows the second application to execute as fast as possible, while allowing for higher protection for the first application, without the need to alter the executable code of either application.

Software development is another situation that benefits from the flexible protection hierarchy feature. Software development is typically performed in a development environment that includes a debugging tool that allows executable code under development to be examined for errors. During this development process, it may be desirable to have the maximum protection possible from programming errors in the code being developed, both as a way to uncover hidden programming errors and to prevent damage to other applications in the computer system (including the operating system). In such a case, the protection view of the protection domain(s) containing the executable code under development may be set such that their linkage to other (more stable) protection domains in the system is restricted to protected links.

Figure 18:
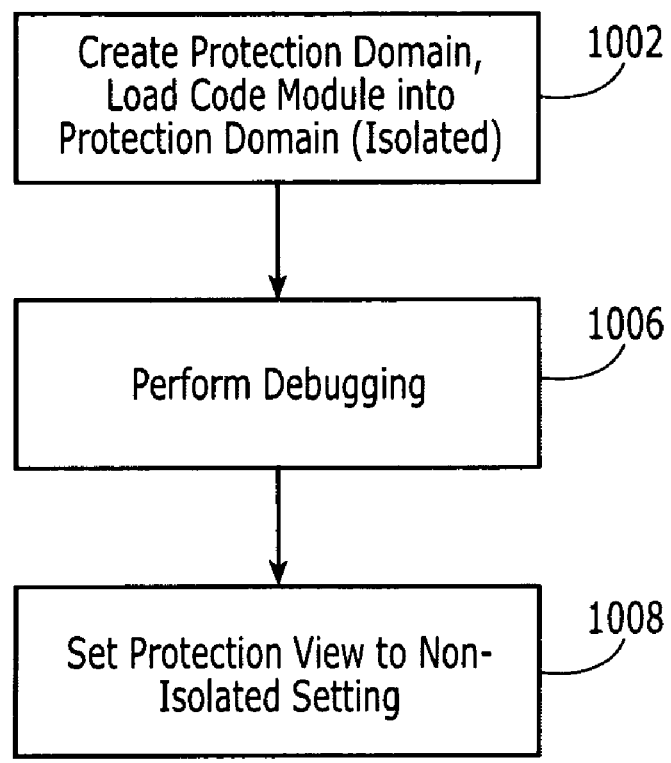
FIG. 18 shows a flow chart of an exemplary debugging process, according to the present invention.

FIG. 18 illustrates a flow chart of an example of the use of the protection domain system in a debugging process. In step 1002, a code module under development is loaded into a protection domain (as previously described) in a computing environment. The protection domain will be created prior to the loading of the code module (for example, as part of the loading process). As part of the loading (and linking) process, the protection domain may attach to one or more other protection domains in the computing environment, and may expand its protection view (where such attachments are unprotected) if such attachments are permitted. However, as part of the debugging process, the code module may be isolated from the other protection domains in the computing environment by setting the protection view of the protection domain to exclude some or all of the other protection domains (e.g., the kernel protection domain). A protection level facility may be provided in the computing environment (for example, as part of a debugging tool) in order to access and manipulate the linking permissions for protection domains in the system to achieve such isolation. This manipulation may be performed prior to the creation of each protection domain (i.e., prior to system execution) or during system execution.

In step 1006, a debugging operation is performed for the code module. This debugging operation may use a debugging tool to allow run-time observation of the code module under development and other known debugging operations. Since the protection view of the protection domain of the code module under development does not include all other protection domains, tasks executing in the protection domain will only be permitted to make calls to functions outside the protection view via protected links. Although protected links in the present example incur additional execution overhead (due to the exception handling routine), during the debugging process this overhead is likely not to be critical. When debugging is complete, the protection view can be set to a privileged level to allow calls using unprotected links to those protection domains which are intended to be in the protection view (step 1008). This may be achieved, for example, using the protection level facility to manipulate the linking permissions of affected protection domains, either during system execution or prior to system execution (as part of a "re-load" of the affected protection domains).

Note that the protection domain system allows variation in the level of system protection for debugging purposes without the need to alter code modules during debugging. Because the exemplary protection system is implemented by managing the linkage between object modules and not by using specific instructions for protected calling methods, the same code module may be executed as is debugged, without the need for recompilation.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A method, comprising the steps of:
    loading a code module into a memory space of a first domain, wherein the first domain owns one of a kernel space and a portion of a user space, the code module including an instruction having a symbol reference;
    determining if the symbol reference is to an external location outside of the memory space;
    generating a link stub for the symbol reference when the symbol reference is to an external location to access the external location;
    redirecting the instruction to the link stub; and
    determining if the external location is within a second domain that is within a protection view of the first domain, wherein the second domain owns the other one of the kernel space and a portion of the user space;
    requesting attachment of the second domain to the first domain when the second domain is determined not to be within the protection view of the first domain; and
    attaching the second domain to the first domain using an attachment mechanism.

2. The method of claim 1, wherein the link stub is part of a linking table entry corresponding to the symbol reference.

3. The method of claim 1, wherein the link stub is a jump instruction to the external location.

4. The method of claim 1, further comprising the steps of:
    determining whether the attachment request is permitted based on authorization information provided by the first domain;
    wherein attachment to the second domain is not permitted when the attachment request is not permitted.

5. A method, comprising:
    creating a task in a first domain, wherein the first domain owns one of a kernel space and a portion of a user space, the task executing a number of instructions;
    executing a first jump instruction in the number of instructions that refers to a link stub corresponding to an external location in a second domain, wherein the second domain owns the other one of the kernel space and a portion of the user space;
    executing the link stub;
    comparing the external location to a task protection view;
    generating a processing exception when the external location is outside the task protection view; and
    executing an exception handling routine in response to the generation of the processing exception, the exception handling routine including,
        saving a pre-exception setting of the task protection view,
        altering the task protection view to include a protection view of the second domain, and
        jumping to the external location.

6. The method of claim 5, wherein the link stub is part of linking table entry corresponding to the external location.

7. The method of claim 5, wherein the link stub includes a second jump instruction to the external location.

8. The method of claim 5, wherein the task protection view is saved on a task protection switch stack.

9. The method of claim 5, further comprising steps of:
retrieving the pre-exception setting of the task protection view;

restoring the task protection view using the pre-exception setting of the task protection view;

returning to a subsequent instruction to the first jump instruction in the number of instructions.

* * * * *